United States Patent [19]
Fischer

[11] Patent Number: 6,016,780
[45] Date of Patent: Jan. 25, 2000

[54] AIR INTAKE DEVICE FOR AN INTERNAL COMBUSTION ENGINE

[75] Inventor: Peter Fischer, Regensburg, Germany

[73] Assignee: Siemens Aktiengesellschaft, Munich, Germany

[21] Appl. No.: 09/093,666

[22] Filed: Jun. 8, 1998

Related U.S. Application Data

[63] Continuation of application No. PCT/DE96/02266, Nov. 25, 1996.

[30] Foreign Application Priority Data

Dec. 7, 1995 [DE] Germany .......................... 195 45 746

[51] Int. Cl.[7] ..................................................... F02B 27/02
[52] U.S. Cl. ................................. 123/184.26; 123/184.55
[58] Field of Search ........................ 123/184.55, 184.57, 123/184.59, 184.26, 184.36, 184.44, 184.41

[56] References Cited

U.S. PATENT DOCUMENTS

| | | | |
|---|---|---|---|
| 4,765,285 | 8/1988 | Kobayashi | 123/184.55 |
| 5,007,386 | 4/1991 | Washizu et al. | 123/184.55 |
| 5,092,284 | 3/1992 | Yamada | 123/184.55 |
| 5,105,774 | 4/1992 | Piccini | 123/184.55 |
| 5,129,368 | 7/1992 | Kristl et al. | 123/184.55 |
| 5,490,484 | 2/1996 | Rutschmann | 123/184.49 |

*Primary Examiner*—Marguerite McMahon
*Attorney, Agent, or Firm*—Herbert L. Lerner; Laurence A. Greenberg

[57] ABSTRACT

An air intake device includes a collector connected through suction pipes to cylinders of an internal combustion engine. An intermediate collector is formed by an auxiliary body and by portions of the suction pipes. The portions of the suction pipes are led in pairs, in parallel and close to one another, through the intermediate collector. Two adjacent suction pipes are each assigned a wing flap which has three wings and is disposed in the intermediate collector. In an end position, each wing flap opens a main orifice through which the suction pipes communicate with the auxiliary body and a secondary orifice through which two adjacent suction pipes communicate directly. In a closing position, the wing flap closes the orifices. Two different effective suction pipe lengths are thereby obtained in the two positions of the wing flap.

5 Claims, 2 Drawing Sheets

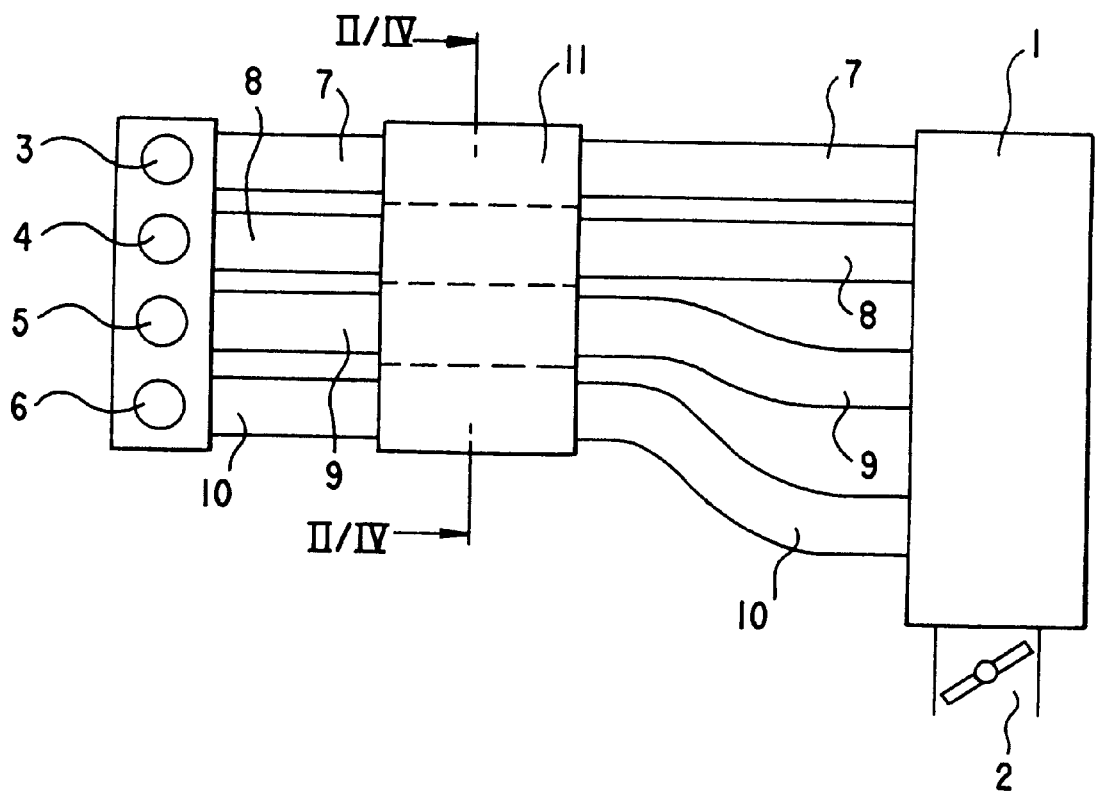
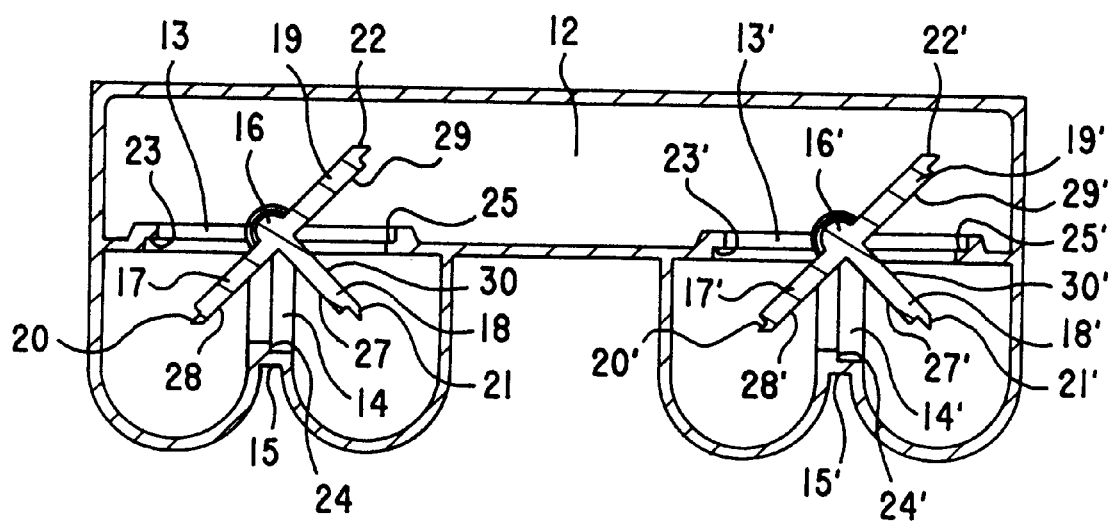

AIR INTAKE DEVICE FOR AN INTERNAL COMBUSTION ENGINE

CROSS-REFERENCE TO RELATED APPLICATION

This application is a continuation of International Application No. PCT/DE96/02266, filed Nov. 25, 1996, which designated the United States.

BACKGROUND OF THE INVENTION

Field of the Invention

The invention relates to an air intake device for an internal combustion engine, including a collector communicating with the outside air through a throttle flap intake port, at least four suction pipes connected to the collector, an intermediate collector formed by an auxiliary body and by portions of the suction pipes, the portions having main orifices for communicating with the auxiliary body and secondary orifices for communicating with one another, and a pivotably mounted wing flap having three wings which open the main orifice and the secondary orifice in an end position, and close off both the main orifice and the secondary orifice in a closing position.

The structure of the air intake device for an internal combustion engine has an appreciable influence on the filling of the cylinders with air. Systems with vibrational charging utilize the flow dynamics of the suction pipes in order to optimize the filling process. At low engine speeds, better filling and therefore a higher torque can be achieved due to long suction pipes, whereas at high engine speeds, the suction pipes must be made short for that purpose.

An air intake device for an internal combustion engine which is known from UK Patent Application GB 2 210 665 A has a collector which is connected to the outside air through an intake port. Four cylinders of the internal combustion engine are connected to the collector through suction pipes. The suction pipes are disposed, in one portion, around a cylindrical auxiliary body and have orifices leading thereto. Inside the auxiliary body there is a switching device in the form of a switching roller with four segment-like sealing surfaces which are distributed around the periphery of its inner wall and which have the same curvature as the inner wall of the auxiliary body and bear on that inner wall. The sealing surfaces are disposed in such a way that they can be brought into two positions as a result of a rotational movement about the longitudinal axis of the auxiliary body. In an end position, the suction pipes can communicate with one another through the orifices, and in a closing position, the sealing surfaces close off the orifices to the suction pipes.

On one hand, when the sealing surfaces are in the closing position, the suction pipe length corresponds to the length which is effective for the air flow. On the other hand, when they are in the end position, strong air turbulence occurs in the region of the auxiliary body and the flow breaks away. The suction pipes communicate through the auxiliary body and thus form an intermediate collector together with the auxiliary body. It is only the length of the suction pipes from the auxiliary body to the cylinders which then has any bearing on the effects of the flow dynamics in terms of the cylinders.

The sealing surfaces, when in the end position, must open the orifices completely. The diameter of the auxiliary body must therefore be dimensioned in such a way that the inner wall surfaces of the auxiliary body between the orifices are large enough to receive the sealing surfaces. Thus, if the circumference of the auxiliary body is minimized, the suction pipes have to be disposed uniformly around the circumference of the auxiliary body. The structural volume is therefore relatively large and the configuration of the suction pipes is subject to narrow limitations.

The orifices can be closed in a sealing manner only if the auxiliary body and the sealing surfaces have a high accuracy of fit, which is only achieved at a very high outlay, in the case of auxiliary bodies injection-molded from plastic. Even a minimal gap of about 0.1 mm between the sealing surfaces and the inner wall of the auxiliary body leads to strong air turbulence and therefore to a significant reduction in the effective suction pipe length.

If the sealing surfaces are made from elastic material, they are exposed to high shearing forces during rotation, which lead to rapid wear of the sealing surfaces. They are therefore subject to high wear.

The drive for the switching device must be constructed to be high-powered, in order to overcome the frictional forces between the inner wall of the auxiliary body and the sealing surfaces.

SUMMARY OF THE INVENTION

It is accordingly an object of the invention to provide an air intake device for an internal combustion engine, which overcomes the hereinafore-mentioned disadvantages of the heretofore-known devices of this general type, which is constructed in as simple a way as possible and which ensures that good filling of the cylinders of an internal combustion engine is obtained reliably over a wide speed range.

With the foregoing and other objects in view there is provided, in accordance with the invention, an air intake device for an internal combustion engine, comprising a collector communicating with outside air through a throttle flap intake port; at least four suction pipes connected to the collector; an intermediate collector formed by an auxiliary body and by portions of the suction pipes, the portions having main orifices for communicating with the auxiliary body and secondary orifices for communicating with one another; and pivotably mounted wing flaps each having three wings movable between an end position opening the main orifice and the secondary orifice and a closing position closing off the main orifice and the secondary orifice of two respective suction pipes; the portions of each two suction pipes extended in parallel and closely adjacent one another through the intermediate collector in regions of the secondary orifices providing communication between each two suction pipes.

In accordance with another feature of the invention, the portions of the suction pipes and the auxiliary body have bearing surfaces in the region of the main orifices and of the secondary orifices, and the wings have sealing lips resting in a sealing manner on the bearing surfaces in the end position.

In accordance with a further feature of the invention, the wings have first and second sides with surfaces for sealing off the main orifices and the secondary orifices in the portions of the suction pipes, and the surfaces are geometrically constructed for increasing a sealing effect of the wing flaps upon pressure fluctuations in a suction pipe.

In accordance with an added feature of the invention, the portions of the suction pipes in the intermediate collector are parallel and in one plane.

In accordance with a concomitant feature of the invention, the portions of the suction pipes in the intermediate collector are parallel and opposite one another in pairs.

Other features which are considered as characteristic for the invention are set forth in the appended claims.

Although the invention is illustrated and described herein as embodied in an air intake device for an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic view of an air intake device according to the invention;

FIG. 2 is a sectional view of an intermediate connector, which is taken along a line II/IV—II/IV of FIG. 1, in the direction of the arrows;

DESCRIPTION OF THE PREFERRED EMBODIMENTS

Figure 3:
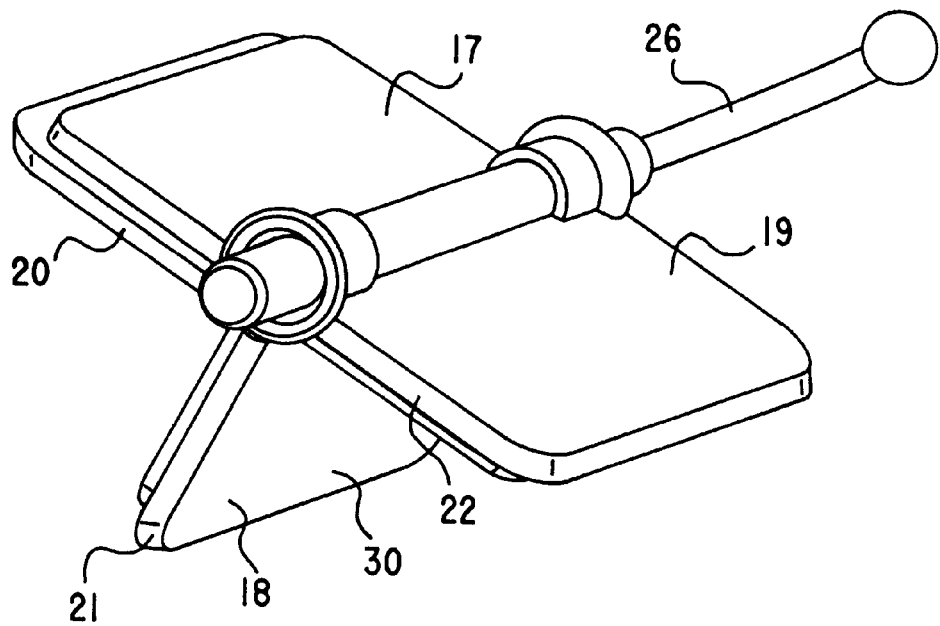
FIG. 3 is an enlarged, perspective view of a wing flap.

Referring now to the figures of the drawings in detail and first, particularly, to FIG. 1 thereof, there is seen an air intake device having a collector 1 which is connected to the outside air through a throttle flap intake port 2. Four cylinders 3, 4, 5, 6 are each connected to the collector 1 through a respective suction pipe 7, 8, 9, 10. The suction pipes 7, 8, 9, 10 are disposed in one plane. However, they may just as easily be constructed helically. The intake device has an intermediate collector 11 in one portion of the suction pipes 7, 8, 9, 10.

A vertical section through the intermediate collector 11 is illustrated in FIG. 2. An auxiliary body 12 has a parallelepipedal cross-section. Portions of two of the suction pipes 7, 8 and portions of another two of the suction pipes 9, 10 are disposed in parallel and closely adjacent one another, along a lower surface of the auxiliary body 12. The auxiliary body 12 has a main orifice 13 directed toward the portions of the two suction pipes 7, 8 and a main orifice 13' directed toward the portions of the other two suction pipes 9, 10. The main orifices extend approximately over the entire length, in the axial direction of the portions of the suction pipes 7, 8; 9, 10.

The portions of the two suction pipes 7, 8 have a secondary orifice 14 on their sides facing one another and are connected to one another through a web 15 which forms a termination of the secondary orifice 14. The portions of the two suction pipes 9, 10 have a secondary orifice 14' on their sides facing one another and are connected to one another through a web 15' which forms a termination of the secondary orifice 14'. Wing flaps 16, 16' are each pivotably mounted approximately in a sectional axis which is between a plane of the main orifice 13, 13' and the secondary orifice 14, 14' of two adjacent suction pipes 7, 8; 9, 10. The wing flaps each have three wings 17, 18, 19; 17' 18', 19' which are constructed in such a way that, when the wing flap 16, 16' is in a closing position, they close off both the main orifice 13, 13' and the secondary orifice 14, 14'.

FIGS. 2 and 3 show that the wings 17, 18, 19, 17', 18', 19' have an outer periphery with sealing lips 20, 21, 22; 20', 21', 22' each bearing against a respective bearing surface 23, 24, 25; 23', 24' 25' at edges of the main orifices 13, 13' and the webs 15, 15' between the suction pipes 7, 8; 9, 10, in the closing position. Furthermore, the sealing lips 20, 21, 22, 20', 21', 22' have molded bevels or slopes. The sealing lips 20, 21, 22; 20', 21', 22' are therefore not exposed to any shearing forces during pivoting movements of the wing flaps 16, 16'. Their wear is therefore minimized. The wing flaps 16, 16' have a lever 26, 26' which is adjusted through a simple drive. The drive may have a pressure cell, for example, which is connected through a linkage to the levers 26, 26' of the wing flaps 16, 16' and which can adjust the latter into the closing position and into an end position.

In the end position, the wings 17, 18, 19; 17', 18', 19' have pivoted through about 45° in comparison with the closing position. Thus, the portions of the suction pipes 7, 8, 9, 10 and the auxiliary body 12 then form a common volume. The air flowing in from the collector 1 through the suction pipes 7, 8, 9, 10 is swirled strongly and spreads out in the entire volume. The intermediate collector 11 thereby forms an air reservoir and acts in the same way as another collector 1. The length of the suction pipes 7, 8, 9, 10 which is effective for filling the cylinders 3, 4, 5, 6 is thus reduced to the length of the suction pipes 7, 8, 9, 10 between the respective cylinder 3, 4, 5, 6 and the intermediate collector 11.

Figure 4:
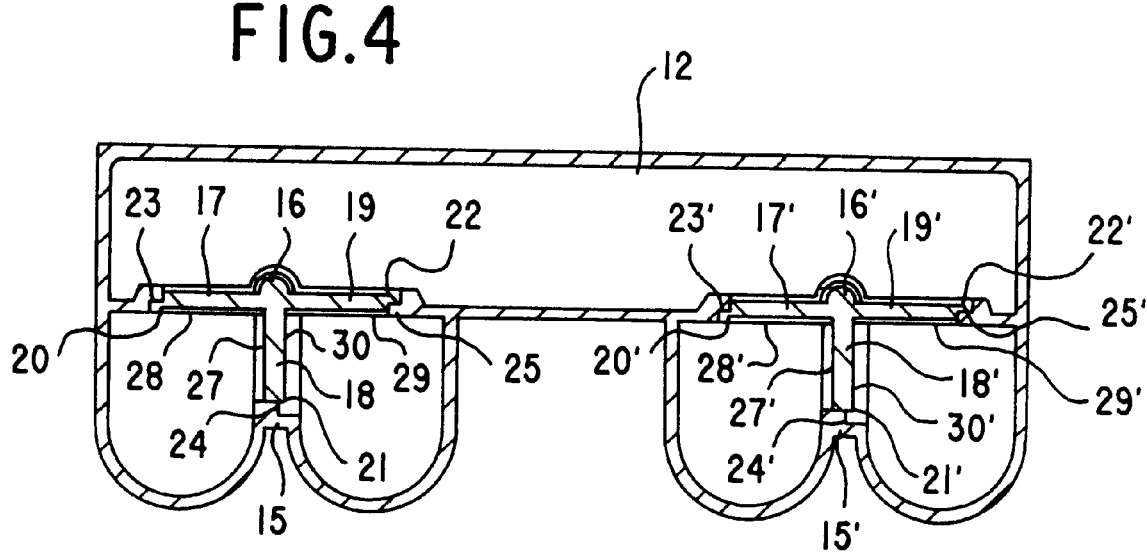
FIG. 4 is another sectional view of the intermediate collector, taken along the line II/IV—II/IV of FIG. 1, in the direction of the arrows.

In the closing position shown in FIG. 4, the sealing lips 20, 21, 22; 20', 21', 22' are pressed onto the bearing surfaces 23, 24, 25; 23', 24', 25'. The torque is dimensioned in such a way that the sealing lips 20, 21, 22; 20', 21', 22' come to bear against the bearing surfaces 23, 24, 25; 23', 24', 25' without any gap, even when there are tolerances in the bearing surfaces 23, 24, 25; 23', 24', 25' and the wing flap 16, 16'. A sealing closure of the main orifice 13, 13' and of the secondary orifice 14, 14' is thus ensured in the closing position. The flow is then undisturbed in the portions of the suction pipes 7, 8, 9, 10 disposed in the region of the intermediate collector 11, so that the entire length of the suction pipes 7, 8, 9, 10 is effective.

The adjacent wings 17, 18; 18, 19; 17', 18'; 18', 19', which in each case close off a suction pipe 7, 8, 9, 10 in the closing position, have a first side 27, 29; 27', 29' and an adjacent second side 28, 30, 28', 30'. The first side 27, 29; 27', 29' is that side at which the sealing lip 21, 22, 21', 22' rests against the bearing surface 24, 25, 24', 25' in the closing position. The adjacent wings 17, 18; 18, 19; 17', 18'; 18', 19' are constructed in such a way that the resultant torque occurring in the case of pressure differences in the suction pipes 7, 8, 9, 10 when the wing flap 16, 16' is in the closing position causes the sealing lips 20, 21, 22; 20', 21', 22' to be pressed to an increased extent onto the bearing surfaces 23, 24, 25; 23', 24', 25'. For this purpose, in the closing position, the first side 27, 29; 27', 29' has a smaller area on which the air pressure acts than the second side 28, 30, 28', 30'. The drive therefore does not have to exert any torque in order to prevent the wing flap 16, 16' from rattling during pulsations of air in the suction pipes 7, 8, 9, 10.

The torque for moving the wing flaps 16, 16' out of the end position into the closing position, and vice versa, essentially only has to overcome friction in bearings in which the wing flap 16, 16' is mounted. A simple drive with low power could therefore be used.

A particularly flat construction of the air intake device can be achieved due to all four suction pipes 7, 8, 9, 10 being disposed in one plane in this exemplary embodiment.

The portions of each two suction pipes 7, 8; 9, 10 may also be disposed opposite one another. The auxiliary body 12 would then be located between them. The implementation of the invention can thus be adapted to the respective restrictions regarding the construction space.

I claim:

1. An air intake device for an internal combustion engine, comprising:

a collector communicating with outside air through a throttle flap intake port;

at least four suction pipes connected to said collector;

an intermediate collector formed by an auxiliary body and by portions of said suction pipes, said portions having main orifices for communicating with the auxiliary body and secondary orifices for communicating with one another; and pivotably mounted wing flaps each having three wings movable between an end position opening said main orifice and said secondary orifice and a closing position closing off said main orifice and said secondary orifice of two respective suction pipes;

said portions of each two suction pipes extend in parallel and closely adjacent one another through said intermediate collector in regions of said secondary orifices providing communication between each two suction pipes.

2. The air intake device according to claim 1, wherein said portions of said suction pipes and said auxiliary body have bearing surfaces in the region of said main orifices and of said secondary orifices, and said wings have sealing lips resting in a sealing manner on said bearing surfaces in said end position.

3. The air intake device according to claim 1, wherein said wings have first and second sides with surfaces for sealing off said main orifices and said secondary orifices in said portions of said suction pipes, and said surfaces are geometrically constructed for increasing a sealing effect of said wing flaps upon pressure fluctuations in a suction pipe.

4. The air intake device according to claim 1, wherein said portions of said suction pipes in said intermediate collector are parallel and in one plane.

5. The air intake device according to claim 1, wherein said portions of said suction pipes in said intermediate collector are parallel and opposite one another in pairs.

* * * * *